June 19, 1956    A. WIRTH    2,750,677

BUBBLE LEVEL

Filed Dec. 20, 1951

Inventor:
Armin Wirth,
by Singer, Stern & Carlberg
Attorneys.

United States Patent Office 2,750,677
Patented June 19, 1956

2,750,677

BUBBLE LEVEL

Armin Wirth, Zurich, Switzerland

Application December 20, 1951, Serial No. 262,605

8 Claims. (Cl. 33—211)

The invention relates to a bubble level and to instruments comprising such a bubble level for the correct positioning thereof.

It is a main object of the invention to provide a bubble level which is easily viewable from any desired direction, particularly vertically from above, horizontally from the side, or from any intermediate direction.

It is another object of the invention to provide a bubble level which efficiently utilises what luminosity is available in its environment so as to give good viewability even at poor luminosity.

It is a further object of the invention to provide a bubble level which requires little space and depth and can be fitted flush into the dial of an instrument equipped with it such as an automatic scale.

It is yet another object of the invention to provide a bubble level which can be fitted behind the protective glass of dial of an instrument equipped with such bubble level, so as to be protected from damage, dirt and corrosion, without hampering the operation and the viewing of said instrument, and without making said instrument liable of being opened and exposed to damage, dirt and corrosion in order to get access to said bubble level.

According to a main feature of the invention, a bubble level comprises a bubble level body of transparent material with a cavity for the bubble level liquid and bubble, and a plug closing said cavity from one side, the thickness of the transparent material above said cavity being large in comparison with the width of said cavity, and the viewing face of said body being convex.

Preferably viewing face forms a magnifying lens giving an optical enlargement of the bubble level cavity to the observer, the diameter of the apparent image of the bubble level bore corresponding substantially to the diameter of said convex face.

The radius of curvature of said convex viewing face is preferably in the ratio from ¼ to ⅔ of the thickness of the transparent material.

Preferably viewing face is arranged at an angle to the bubble level bore, transparent bubble level body having an internally reflecting face deflecting the light rays from the bubble level bore to the viewing face. It is advantageous if transparent bubble level body has a face, the general plane of which is substantially tangent to convex viewing face and is arranged laterally to the bubble level cavity, allowing the entry of external lighting into the bubble level cavity. This cavity is then preferably arranged close to general plane.

The face allowing the entry of external lighting into the bubble level cavity is preferably made impermeable to view by being made frosted or serrated.

Preferably the inner face of the plug closing the bubble level cavity from one side has strong light-reflecting properties, for example by consisting of a strongly light-reflecting aluminum alloy.

According to another feature of the invention a bubble level having a lateral viewing face as described hereinabove is fitted into a cut-out in the dial of an instrument equipped with it, the general plane substantially coinciding with the face of said dial. The pointer of the instrument may then pass in front of said bubble level, which may be attached to a bracket of the instrument casing arranged behind said dial, and bubble level may be protected by a protective glass plate at the front of said instrument.

Further objects and features of the invention may become apparent from the description of some embodiments thereof given by way of example with reference to the accompanying drawings, in which.

Figure 1:
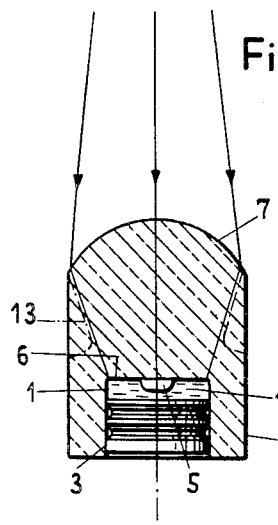
Fig. 1 is a longitudinal section of a bubble level designed for a vertical direction of viewing.

The body 2 of the bubble level is conveniently made of an easily machinable material such as transparent artificial substances. A bore 1 in the body 2 is closed from below by a plug 3 having a series of grooves in its peripheral surface. The bubble 5 in the bubble level liquid 4 plays on the downward face 6 of the bore in the body 2 which is cambered according to the sensitivity required. The bubble level body 2 has a convex lens face 7. Thereby the diameter of the bore 1 appears enlarged on the lens face 7. Since the whole bubble level body 2 consists of transparent material and no metal fitting is required, the light has access from all sides. Even with unfavourable lighting conditions sufficient luminosity is thus assured.

Conveniently the diameter of the lens face 7, the enlargement coefficient thereof and the diameter of the bore 1 are so selected, that the apparent diameter of the bore 1 coincides with the diameter of the lens face 7, the enlargement by the lens face 7 being conveniently chosen to be 1.3 to 4. When the direction of viewing is too much inclined, the bubble and the annular zone surrounding the same is not visible or visible merely at the edge of the lens face 7. Accordingly, in contradistinction to the known bubble levels, no more space in diameter is required, than is desired for the reading itself, namely the diameter of the lens face 7.

The plug 3 is preferably made of an aluminium alloy of high light reflecting capacity. When the outer shape is formed in accordance with the path of the marginal rays, as shown in Fig. 1 in chain dotted lines 13, the image of the bubble level appears as if on the bottom of a bore, which facilitates proper adjustment to the observer.

Figure 2:
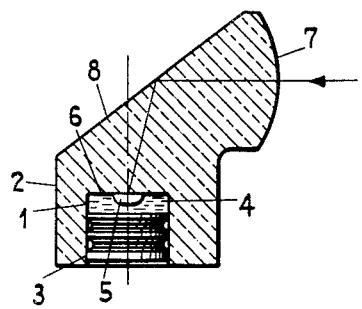
Fig. 2 is a longitudinal section of a bubble level with a horizontal direction of viewing.
Figure 3:
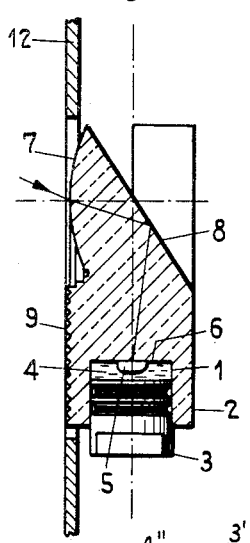
Figs. 3 and 4 are a longitudinal section and a front elevation, respectively of a bubble level with oblique direction of viewing.
Figure 4:
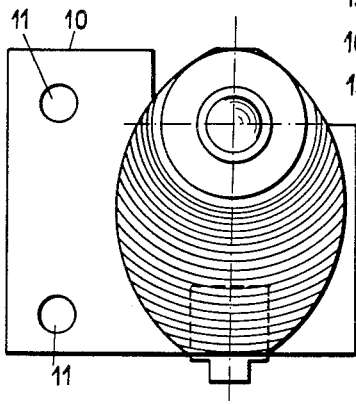

As shown in the two embodiments of Fig. 2 and Figs. 3, 4 the bubble level can be easily modified from the vertical viewing direction of the embodiment of Fig. 1 to a horizontal viewing direction or for a direction inclined at will.

Fig. 2 shows a bubble level for horizontal direction of viewing. The image of the bore 1 is deflected by total reflection on the face 8 (or by reflection on a mirror face) in the horizontal direction and appears as described (and explained previously with reference to Fig. 1) coinciding with the diameter of the lens face 7. As shown in Fig. 2, the central beam of light for the reading of the bubble level can start at an angle from the center of the bubble level. As already described with reference to Fig. 1, the same position of the eye is always enforced, when viewing the bubble level, whereby parallactic errors are obviated.

The embodiments of Fig. 2 or of Figs. 3 and 4, which will now be described, are particularly suited for being fitted frontally into an instrument, for example into the dial of an instrument. Figs. 3 and 4 show a particularly favorable embodiment in which the front face 9 as well as the lens face 7 can be built in flush into a cut-out in the dial 12 of an instrument. Very little space in depth behind the dial is required. As described with reference to Fig. 2, the image of the margin of the bore 1 appears on the margin of the lens 7, reflected by the reflecting face 8. The direction of viewing is here intentionally chosen to be oblique from above. The front face 9 may be made frosted or serrated, so that the incident light illuminates the bubble level in a favorable manner, while the bubble level proper is not visible through the front face. A lug 10 with bores 11 can be provided on the bubble level body 2.

Owing to the small requirement of space, the good conditions of illumination, and the choice available for the viewing directions, the bubble level according to the invention can be easily built into any instrument dial, regardless of whether the dial has a horizontal, oblique or vertical position. As a rule the bubble level will be arranged behind the protective glass of the dial, so that the higher liability to scratching of an organic transparent material is of no importance, whereas the much easier machinability thereof is of advantage.

Figure 5:
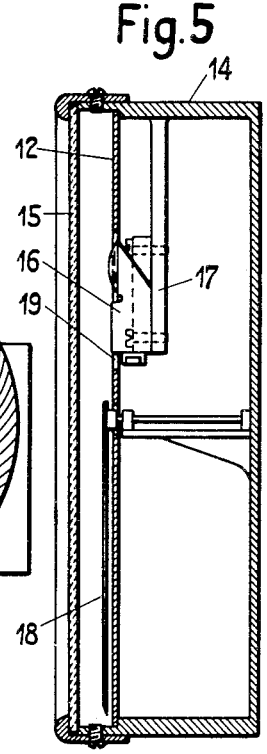
Fig. 5 shows in longitudinal section on a smaller scale how a bubble level according to Figs. 3 and 4 may be fitted into a casing of an instrument.

For example as shown in Fig. 5 the bubble level 16 can be arranged in the casing 14 of a measuring instrument behind the protective glass 15 in a cut-out of the instrument dial 12. The bubble level is attached on the carrier arm 17 of the casing 14. The bubble level 16 is always in the field of vision of the observer, and the pointer 18 of the instrument can pass unhampered over the bubble level if necessary. The bubble level is protected by the casing 14 and the glass 15 from being damaged or soiled.

The aforesaid description and drawings relate to a box bubble level. Obviously a tubular bubble level could be provided instead of a box bubble level, or two tubular bubble levels could be combined into one cross bubble level, both in the same field of vision.

Figure 7:
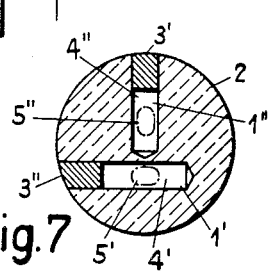
Figs. 6 and 7 are cross sections in plan view of modified bubble level bodies, the embodiment of Fig. 6 having a transverse horizontal tubular bore, and the embodiment of Fig. 7 having two such bores arranged at right angles to one another in the same horizontal plane, forming a cross bubble level.
Figure 6:
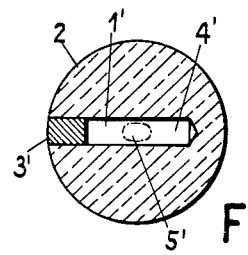

In Figs. 6 and 7 cross sections of such embodiments are shown in plan view.

In the embodiment according to Fig. 6, instead of the drum shaped vertical bore of the embodiments of Figs. 1 to 3, a lateral horizontal tubular bore 1' is provided for the bubble level liquid 4' and bubble 5', and is stopped at its outer end by a stopper 3'. The bubble 5' appears in the center of the field of vision as observed through a lens corresponding to the lens 7 as described with reference to one of the Figs. 1 to 3.

In the embodiment according to Fig. 7, two tubular bubble level bores 1', 1" are provided at right angles to one another in the same horizontal plane. They form thus a cross-bubble level, the bubbles 5', 5" of which indicate deviations from the vertical in two directions normal to one another. The two bubbles 5', 5" are close enough to one another to appear in a common field of vision as observed through a lens corresponding to the lens 7 as described with reference to any one of the Figs. 1 to 3. The tubular bores 1', 1" are filled partly by the bubble level liquid 4', 4", respectively, and closed from outside by the stoppers 3', 3", respectively.

While I have described what may be considered typical and particularly useful embodiments of my said invention, I wish it to be understood, that I do not limit myself to the details and dimensions described and illustrated, for obvious modifications will occur to a person skilled in the art in accordance with the circumstances and conditions in which my said invention is to be applied.

What I claim as my invention and desire to secure by Letters Patent, is:

1. A bubble level comprising a one-piece bubble level body of transparent material with a cavity for the bubble level liquid and bubble, and a plug closing said cavity from one side, the thickness of the transparent material above said cavity being large in comparison with the width of said cavity, and the viewing face of said body being convex and being arranged at an angle to said bubble level bore, said transparent bubble level body having an internally reflecting face deflecting the light rays from the bubble level bore to said viewing face, and having a face the geometrical plane of which is substantially tangent to said convex viewing face and arranged laterally to said bubble level cavity allowing the entry of external lighting into said bubble level cavity.

2. A bubble level as claimed in claim 1 wherein said bubble level cavity is arranged close to said face, the general plane of which is substantially tangent to said convex viewing face.

3. A bubble level as claimed in claim 1 wherein said face, the general plane of which is substantially tangent to the convex viewing face, is serrated.

4. A bubble level comprising a one-piece bubble level body of transparent material with a cavity for the bubble level liquid and bubble, and a plug closing said cavity from one side, the thickness of the transparent material above said cavity being large in comparison with the width of said cavity, and the viewing face of said body being convex, the inner face of said plug being strongly light-reflecting.

5. A bubble level comprising a one-piece bubble level body of transparent material with a cavity for the bubble level liquid and bubble, and a plug closing said cavity from one side, the thickness of the transparent material above said cavity being large in comparison with the width of said cavity, and the viewing face of said body being convex, the inner face of said plug being of a strongly light reflecting aluminium alloy.

6. An instrument including a dial having a cut-out, a bubble level comprising a bubble level body of transparent material with a cavity for the bubble level liquid and bubble, and a plug closing said cavity from one side, the thickness of the transparent material above said cavity being large in comparison with the width of said cavity, and the viewing face of said body being convex, and having a face the geometrical plane of which is substantially tangent to said convex viewing face and arranged laterally to said bubble level cavity, allowing the entry of external lighting into said bubble level cavity, said bubble level fitting into said cut out with its general plane substantially coinciding with the face of said dial.

7. An instrument including a casing, a dial, a pointer playing in front of said dial, a protective glass in front of said dial and pointer, said dial having a cut-out, a bracket attached to said casing behind said dial, and a bubble level attached to said bracket and comprising a bubble level body of transparent material with a cavity for the bubble level liquid and bubble, and a plug closing said cavity from one side, the thickness of the transparent material above said cavity being large in comparison with the width of said cavity to provide a viewing face extending in the general plane of said body, and the viewing face of said body being convex, said bubble level fitting into said cut-out with the general plane of said viewing face substantially coinciding with the face of said dial.

8. A bubble level comprising a bubble level body of transparent material with a cavity for the bubble level liquid and bubble, and a plug closing said cavity from one side, the thickness of the transparent material above said cavity being large in comparison with the width of said cavity, and the viewing face of said body being convex and being arranged at an angle to said bubble level bore, said transparent bubble level body having an internally reflecting face deflecting the light rays from the bubble level bore to said viewing face, and having a serrated face the general plane of which is substantially tangent to said convex viewing face and arranged laterally to said bubble level cavity allowing the entry of external lighting into said bubble level cavity.

References Cited in the file of this patent

UNITED STATES PATENTS

| | | |
|---|---|---|
| 1,113,805 | McNeil | Oct. 13, 1914 |
| 1,668,015 | Harris | May 1, 1928 |
| 1,712,112 | Keuffel | May 7, 1929 |
| 1,900,332 | Caradi | Mar. 7, 1933 |
| 2,221,152 | Rylsky | Nov. 12, 1940 |
| 2,305,678 | Cravaritis | Dec. 22, 1942 |
| 2,369,802 | Rylsky | Feb. 20, 1945 |
| 2,432,875 | Flint | Dec. 16, 1947 |
| 2,514,492 | Hayward | July 11, 1950 |
| 2,521,558 | Alvarez | Sept. 5, 1950 |

FOREIGN PATENTS

| | | |
|---|---|---|
| 9,849 | Great Britain | Aug. 19, 1885 |
| 559,325 | Great Britain | Feb. 14, 1944 |
| 574,750 | Great Britain | Jan. 18, 1946 |
| 121,178 | Australia | Mar. 28, 1946 |